C. C. Nichols,
Making Artificial Flowers.
N° 5,867.        Patented Oct. 17, 1848.
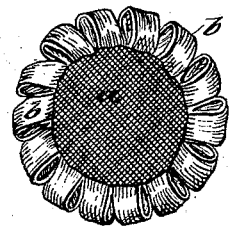
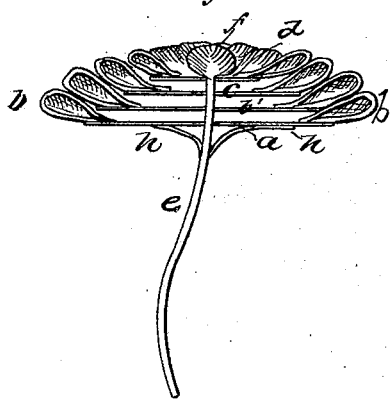
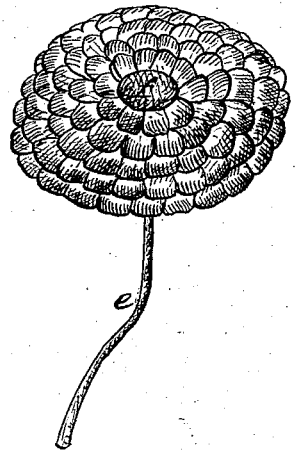

UNITED STATES PATENT OFFICE.

CAROLINE C. NICHOLS, OF PROVIDENCE, RHODE ISLAND.

MANUFACTURE OF ARTIFICIAL FLOWERS.

Specification of Letters Patent No. 5,867, dated October 17, 1848.

*To all whom it may concern:*

Be it known that I, CAROLINE C. NICHOLS, of Providence, in the county of Providence and State of Rhode Island, have invented a new and useful Improvement in the Manufacture of Artificial-Flower Work; and I do hereby declare that the same is fully described and represented in the following specification and accompanying drawings, letters, figures, and references thereof.

My improvement is particularly applicable to the fabrication of artificial roses or articles resembling the same. For this purpose, I take what is usually termed "floss" silk, and wind it around a round or other proper shaped rod or stick, in a helix or screw form, and so that the turns may be very close together. This being done, I next draw the rod or stick out of the silk so wound upon it and flatten or press down the helix of silk. The band or helix so prepared I connect by means of gum tragacanth or other proper material to the upper surface of a thin circular piece of silk cloth pasteboard or other suitable substitute as seen in Figures 1 and 2 of the drawings, wherein *a* denotes the circular piece of pasteboard, silk or other substance and *b* the flattened helix of silk, cemented to it, around or just within its circumference or outer edge.

Fig. 1 denotes a top view of one section of a layer of a flower prepared in the above described manner. Fig. 2, is a cross section of the same. Fig. 3 exhibits a transverse section of the flower completed, and Fig. 4, is a perspective view of the same.

Next I make several more of such layers or sections each of which shall be smaller in diameter than that which it is to rest upon, and I place them together, or on one another as seen at *a*, *b*, *c*, *d*, &c., in Fig. 3, making thereby the corolla of the flower. I confine them by means of cement and a stem or curved wire *e*, which I pass through the central part of the mass. The said wire is to have a silk tuft *f* to represent the pistil or central part of the flower, made upon its end. The corolla is confined against the pistil by a piece of green paper cloth, or other proper material *h*, *h*, cemented to the stem, and bottom piece *a*, and made to represent the calyx.

In the formation of the corolla, I make use of floss silk of such color or colors as fancy may dictate, or as it may be necessary to use to represent the various colors of a rose, dahlia, or other flower, to be imitated.

What I claim as my invention is—

The aforedescribed improved manner of manufacturing an artificial flower or the corolla thereof, viz: the making the same of helix of floss silk, combined together and with circular bases or pieces of cloth or pasteboard, substantially as above described.

In testimony whereof I have hereto set my signature this second day of October A. D. 1847.

CAROLINE C. NICHOLS.

Witnesses:
B. W. WHEELER,
BENJAMIN T. EAMES.